US012791479B2

(12) United States Patent
Gupta et al.

(10) Patent No.: US 12,791,479 B2
(45) Date of Patent: Nov. 10, 2026

(54) LIGAND ASSISTED DISSOCIATION

(71) Applicant: Nicoya Lifesciences Inc., Kitchener (CA)

(72) Inventors: Shalini Gupta, Toronto (CA); Arjun Sudarsan, Carlsbad, CA (US); Ryan Denomme, Kitchener (CA); Hojjat Seyed Jamali, New Hamburg (CA)

(73) Assignee: Nicoya Lifesciences Inc., Kitchener (CA)

( * ) Notice: Subject to any disclaimer, the term of this patent is extended or adjusted under 35 U.S.C. 154(b) by 13 days.

(21) Appl. No.: 18/726,739

(22) PCT Filed: Mar. 7, 2023

(86) PCT No.: PCT/CA2023/050300
§ 371 (c)(1),
(2) Date: Jul. 3, 2024

(87) PCT Pub. No.: WO2023/168521
PCT Pub. Date: Sep. 14, 2023

(65) Prior Publication Data

US 2025/0067669 A1 Feb. 27, 2025

Related U.S. Application Data

(60) Provisional application No. 63/317,806, filed on Mar. 8, 2022.

(51) Int. Cl.
*G01N 21/552* (2014.01)
*B01L 3/00* (2006.01)
*G01N 21/75* (2006.01)
*G01N 21/77* (2006.01)

(52) U.S. Cl.
CPC ...... *G01N 21/553* (2013.01); *B01L 3/502707* (2013.01); *B01L 2300/0645* (2013.01); *G01N 2021/757* (2013.01); *G01N 2021/7763* (2013.01); *G01N 2201/122* (2013.01)

(58) Field of Classification Search
CPC ........... G01N 21/553; G01N 2021/757; G01N 2021/7763; G01N 2201/122; B01L 3/502707; B01L 2300/0645
See application file for complete search history.

(56) References Cited

FOREIGN PATENT DOCUMENTS

WO WO-2020049524 A1 * 3/2020 ........ B01L 3/502792

* cited by examiner

*Primary Examiner* — Georgia Y Epps
*Assistant Examiner* — Don J Williams
(74) *Attorney, Agent, or Firm* — Quarles & Brady LLP

(57) ABSTRACT

Provided herein are methods, systems and digital microfluidic cartridges for the determination of ligand-target analyte affinity value ($K_D$), determination of an association rate constant ($k_{on}$), and/or determination of a dissociation rate constant ($k_{off}$) in a PR (plasmon resonance) based system. More specifically, as described herein, the present disclosure is directed to improved methods, systems and digital microfluidic cartridges for determining a dissociation rate constant ($k_{off}$) using free ligand molecules in the dissociation phase or dissociation step of a standard kinetic binding curve or in ligand-target analyte affinity analysis (referred to herein as ligand assisted dissociation (LAD)).

15 Claims, 3 Drawing Sheets

LIGAND ASSISTED DISSOCIATION

CROSS REFERENCE

This application is a 371 application of International Application No. PCT/CA2023/050300, filed Mar. 7, 2023, which claims the benefit of priority to U.S. Provisional Application No. 63/317,806, filed Mar. 8, 2022, which is hereby incorporated by reference in its entirety herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND

Field of the Disclosure

The present disclosure relates to methods, systems and devices useful for the improved detection of a target analyte using Plasmon Resonance (PR) spectroscopy. In particular, the present disclosure is directed to methods, systems and devices useful for more accurate determination of an interaction between a ligand and a target analyte.

Background of the Disclosure

Plasmon resonance spectroscopy (e.g., surface plasmon resonance (SPR) and localized surface plasmon resonance (LSPR) spectroscopy) are used for a variety of analytical methods such as quantitative, kinetic and thermodynamic studies. PR methods and systems, such as SPR and LSPR, provide a label-free method of determining molecular binding events in real-time for analytes such as DNA, proteins and polymers. Current SPR and LSPR instruments, as well as other types of label-free analysis instruments, suffer from mass transport limited (MTL) kinetics observed in some systems depending on the experimental conditions chosen (flow rate, surface ligand density etc.). One way to mitigate MTL is through use of higher flow rates. However, increasing the flow rate has its own intrinsic limitations as one moves down to smaller length scales in which the fluid flow is in the highly laminar regime. Moreover, due to the large ligand amounts required, and additional preparation needed by the user to determine the correct ligand concentration, current SPR and LSPR instruments are unable to solve the MTL kinetics observed in fast dissociating biomolecular systems. Accordingly, there is a need in the art for PR methods, systems, and cartridges for more accurate determination of ligand-target analyte dissociation rate constants ($k_{off}$) and more accurate determination of ligand-target analyte affinity values ($K_D$).

SUMMARY

The present disclosure is directed to methods, systems and digital microfluidic cartridges for the determination of ligand-target analyte affinity value ($K_D$), determination of an association rate constant ($k_{on}$), and/or determination of a dissociation rate constant ($k_{off}$) in a PR (plasmon resonance) based system. More specifically, as described herein, the present disclosure is directed to improved methods, systems and digital microfluidic cartridges for determining a dissociation rate constant ($k_{off}$) using free ligand molecules in the dissociation phase or dissociation step of a standard kinetic binding curve or in ligand-target analyte affinity analysis (referred to herein as ligand assisted dissociation (LAD)). In accordance with the present disclosure, the inclusion of ligand in the dissociation step or dissociation phase prevents the rebinding of the target analyte to the ligand immobilized on the surface, and thereby, provides a means for overcoming the MTL kinetics observed in fast dissociating biomolecular systems. The present disclosure also relates to carrying out the LAD in miniaturized volumes (e.g., sub-microliter volumes) enabling facile integration of this technology into microfluidic platforms. The disclosure further comprises provisions for modifying the LAD concentration on demand, automatically inside the fluidic cartridge, depending on the input ligand concentration used. The embodiments of the present disclosure can be used in direct kinetic methods and systems (where the surface ligand is covalently conjugated or immobilized on the sensor surface). The embodiments of the present disclosure can be adapted for use in capture kinetic methods and systems (where the surface ligand is captured through a molecular receptor) with appropriate modifications by one of skill in the art.

In one aspect, the present disclosure is directed to a method for determining a dissociation rate constant in ligand-target analyte affinity analysis, the method comprising: (a) providing a digital microfluidic (DMF) cartridge comprising: (i) at least one electrode to perform fluid operations on a fluid in the DMF cartridge: (ii) a fluid channel; and (iii) a sensor located in the fluid channel, wherein the sensor includes an immobilized ligand: (b) providing a first fluid including the target analyte; and (c) flowing the first fluid through the fluid channel and into contact with the sensor: (d) detecting a ligand-analyte interaction; and (e) determining a dissociation rate constant ($k_{off}$) during a dissociation phase of the analyte at the sensor, wherein the dissociation rate constant is determined in the presence of a second fluid containing free ligand molecules.

In some embodiments, the cartridge further comprises a first ligand reservoir storing the immobilization ligand, and wherein the first ligand reservoir is in fluid communication with a fluid channel. In other embodiments, the cartridge further includes a second ligand reservoir storing the free ligand molecules, and wherein the second ligand reservoir is in fluidic communication with a fluid channel. In one embodiment, the immobilized ligand and the free ligand are the same ligand molecule. In another embodiment, the immobilized ligand and the free ligand are different ligands that bind to the same binding site of the target analyte. In still another embodiment, the free ligand can comprise two or more different ligand molecules.

In some embodiments, the cartridge further comprises a running buffer reservoir in fluidic communication with at least one fluidic channel.

In some embodiments, the cartridge further comprises a means for recovering and storing a ligand containing fluid or droplet. In one embodiment, the ligand containing fluid can be stored on a storage electrode or in a storage channel. In another embodiment, the cartridge includes a ligand collection reservoir, wherein the ligand collection reservoir is in fluid communication with at least one fluid channel and operable to recover a ligand containing fluid after an immobilization phase and/or after the dissociation phase. In one embodiment, the recovered ligand containing fluid is used for another reaction phase.

In some embodiments, the cartridge further comprises a running buffer reservoir in fluid communication with a fluid channel, the first ligand reservoir and/or the second ligand reservoir. In one embodiment, the first fluid comprising the target analyte and/or the second fluid comprising the free ligand molecules further includes the running buffer.

In some embodiments, the first ligand in the first ligand reservoir and/or the second ligand in the second ligand reservoir is at a concentration between about 1 μg/mL to about 100 μg/mL. In one embodiment, the concentration of the second ligand in the second fluid reservoir is diluted with the running buffer to a final concentration from about 0.01 μg/mL to about 10 μg/mL.

In some embodiments, the first fluid is split into a first portion and a second portion, wherein the first portion is used to immobilize the ligand to the sensor in an immobilization phase and wherein the second portion is used as the free ligand of the second fluid.

In one embodiment, the first fluid and/or the second fluid flow through a fluid channel in a continuous manner. In another embodiment, the first fluid and the second fluid flow through a fluid channel in separate distinct steps or in separate distinct droplets.

In some embodiments, functionalized ligand binding sites on the surface of the sensor are blocked with a blocking agent after immobilization of the ligand to the sensor and prior to determining the dissociation rate constant ($k_{off}$).

In another aspect the present disclosure is directed to methods for determining a ligand-target analyte affinity value ($K_D$) between a target analyte and a ligand, the method comprising: (a) providing a digital microfluidic (DMF) cartridge comprising: (i) at least one electrode to perform fluid operations on a fluid in the DMF cartridge: (ii) a fluid channel; and (iii) a sensor located in the fluid channel, wherein the sensor includes an immobilized ligand: (b) providing a first fluid including the target analyte; and (c) flowing the first fluid through the fluid channel and into contact with the sensor: (d) detecting a ligand-analyte interaction: (e) determining an association constant ($k_{on}$) during the association phase of the analyte at the sensor: (f) providing a second fluid including free ligand molecules: (g) flowing the second fluid through the fluid channel and into contact with the sensor: (h) determining a dissociation rate constant ($k_{off}$) during a dissociation phase of the analyte at the sensor, wherein the dissociation rate constant is determined in the presence of the free ligand molecules; and (i) determined the ligand-target analyte affinity value ($K_D$) based on the measured association constant ($k_{on}$) and the measured dissociation constant ($k_{off}$).

In some embodiments, the cartridge further comprises a first ligand reservoir storing the one or more first ligand molecules, and wherein the first ligand reservoir is in fluid communication with the fluid channel. In other embodiments, the cartridge further comprises a second ligand reservoir storing the free ligand molecules, and wherein the second ligand reservoir is in fluid communication with at least one fluid channel. In one embodiment, one or more first ligand molecules and the free ligand molecules are the same ligand molecule. In still another embodiment, the free ligand can comprise two or more different ligand molecules.

In some embodiments, the cartridge further comprises a running buffer reservoir in fluid communication with the fluid channel.

In some embodiments, the cartridge further comprises a means for recovering and storing a ligand containing fluid or droplet. In one embodiment, the ligand containing fluid can be stored on a storage electrode or in a storage channel. In another embodiment, the cartridge further comprises a ligand collection reservoir, and wherein the ligand collection reservoir is in fluid communication with the fluid channel and operable to recover a ligand containing fluid after an immobilization phase, an association phase and/or after the dissociation phase. In one embodiment, the recovered ligand containing fluid is used for another reaction phase.

In some embodiments, the cartridge further comprises a running buffer reservoir in fluid communication with the fluid channel, the first ligand reservoir and/or the second ligand reservoir. In one embodiment, the first fluid comprising the target analyte and/or the second fluid comprising the free ligand molecules further includes the running buffer.

In some embodiments, the first ligand in the first ligand reservoir and/or the second ligand in the second ligand reservoir is at a concentration of between about 1 μg/mL to about 100 μg/mL. In another embodiment, the concentration of the second ligand in the second fluid in the second fluid reservoir is diluted with the running buffer to a final concentration of from about 0.01 μg/mL to about 10 μg/mL.

In some embodiments, the first fluid is split into a first portion and a second portion, wherein the first portion is used to immobilize the ligand to the sensor in an immobilization phase and wherein the second portion is used as the free ligand of the second fluid.

In one embodiment, the first fluid and/or the second fluid flow through the fluid channel in a continuous manner. In another embodiment, the first fluid and the second fluid flow through the fluid channel in separate distinct steps or in separate distinct droplets.

In some embodiments, functionalized ligand binding sites on the senor surface are blocked with a blocking agent after immobilization of ligand to the sensor and prior to determining the dissociation rate constant ($k_{off}$).

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DEFINITIONS

Abbreviations and Acronyms

Figure 1:
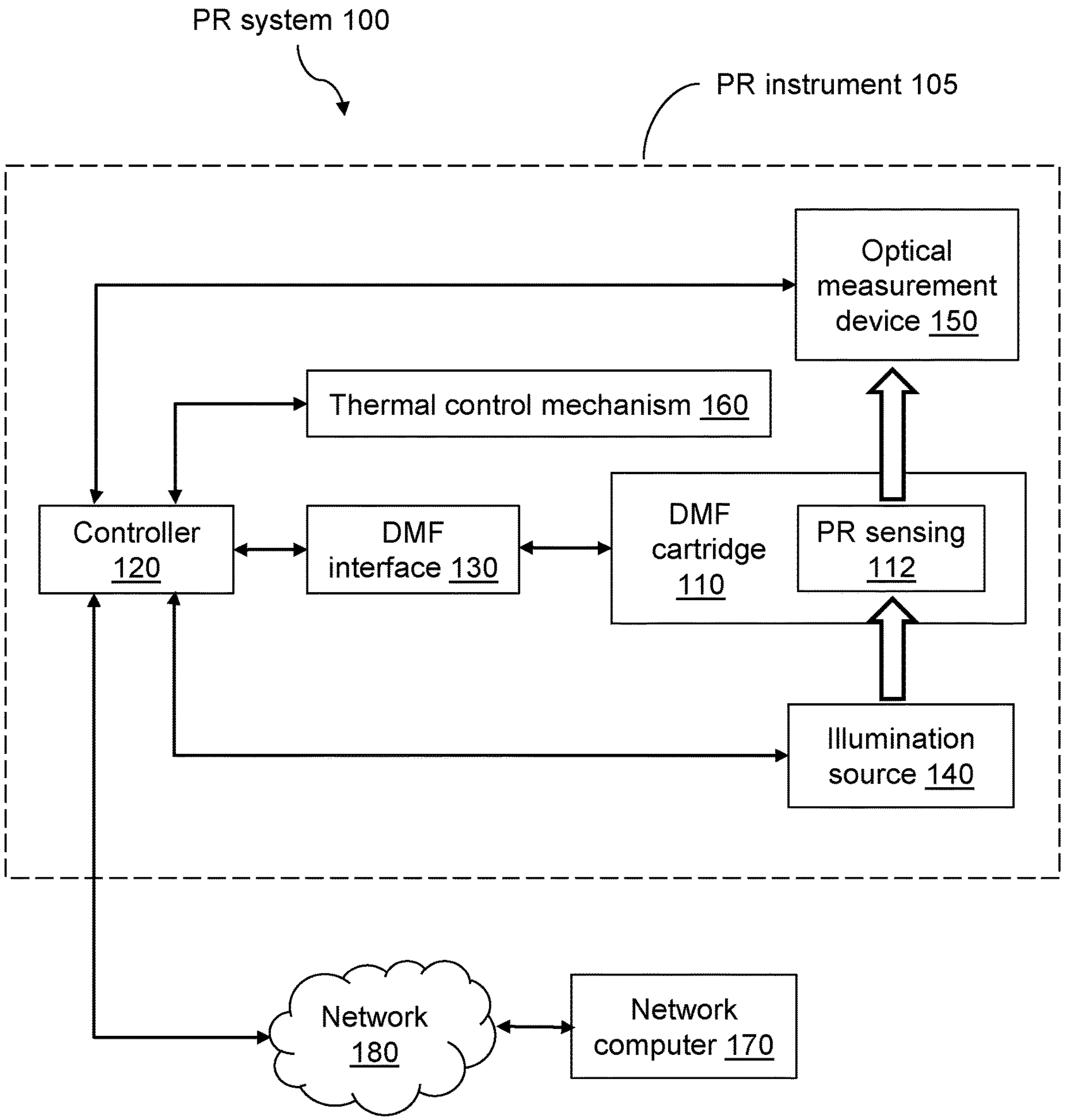
FIG. 1 illustrates an exemplary plasmon resonance (PR) sensor system for determining binding kinetics between a target analyte and ligand, according to principles described herein.

"LAD" is the acronym for "ligand assisted dissociation."

"LSPR" is the acronym for "localized surface plasmon resonance."

"SPR" is the acronym for "surface plasmon resonance."

General Definitions

"Analyte" or "target analyte" means a chemical or molecule of interest which binds to the ligand and for which the binding kinetics with the ligand can be determined in accordance with the disclosure. The analyte may include, for example, small molecules, proteins, peptides, antibodies, nucleic acids, atoms, ions, polymers, and the like.

"Ligand" means a compound or molecule which may be coupled or immobilized to a sensor and which is used to bind with, couple to or otherwise capture the target analyte. The ligand, may for example, be any binder, such as an antibody, aptamer, polymer, DNA or other capture molecule having affinity for an analyte. In some embodiments, the ligand is immobilized to the PR sensor (e.g., for direct or capture kinetic).

DETAILED DESCRIPTION

In some embodiments, the presently disclosed subject matter may provide a PR system and instrument, DMF cartridge, and methods of using PR and fluid manipulation on the DMF cartridge for analysis of a target analyte. In one embodiment, the PR system can be a surface plasmon resonance (SPR) system. In another embodiment, the PR system can be a localized surface plasmon resonance (LSPR) system.

The DMF cartridge can be used to facilitate DMF capabilities known in the art. For example, DMF capabilities generally for merging, splitting, dispensing, diluting, transporting, and other types of fluid operations (e.g., droplet manipulation). One application of these DMF capabilities may be for sample preparation. Further, the DMF cartridge can include PR sensing means for (1) detecting, for example, certain molecules (e.g., target analytes) and/or chemicals in the sample, and (2) analysis of analytes, such as for measuring binding events in real time to extract ON-rate information, OFF-rate information, affinity information, avidity, aggregation, specificity information, conformation changes, thermodynamic parameters, and/or other data/information related to the molecules under study. Another application of this embodiment may be to explore the interactions between drugs and biomolecules or to study the chemical properties of polymers.

Plasmon Resonance (PR) System and Instrument

A PR instrument of the PR system may include the DMF cartridge, an optical detection system, and a controller. The optical detection system may include, for example, an illumination source and an optical measurement device in relation to the PR sensing elements. In some embodiments, the optical detection system may operate in transmission mode while in other embodiments, the optical detection system may operate in reflection mode. The controller may be provided for controlling fluid manipulation (e.g., droplet manipulation) by activating/deactivating electrodes in the DMF cartridge. The controller also may manage the overall operations of the PR system.

In one embodiment, as shown in FIG. 1, a block diagram of an embodiment of the presently disclosed PR system 100 that includes a DMF cartridge 110 that may include PR sensing mechanisms 112 for analysis of a target analyte. As disclosed elsewhere herein, PR system 100 can be a SPR system or an LSPR system. In PR system 100 for analysis of a target analyte, analysis can mean, for example, detection, identification, quantification, or measuring analytes and/or the interactions of analytes with other substances, such as binding kinetics. Exemplary analytes may include, but are not limited to, small molecules, proteins, peptides, antibodies, nucleic acids, atoms, ions, polymers, and the like. For example, PR system 100 can be used to measure the binding kinetics of a ligand to a macromolecule, such as a receptor.

DMF cartridge 110 may facilitate DMF capabilities generally for fluidic actuation including droplet merging, splitting, dispensing, diluting, and the like. These DMF capabilities can be used for sample preparation, as is well known in the art. For example, one application of these DMF capabilities may be fluid splitting of a ligand containing fluid allowing a first portion of the ligand containing fluid to be used for ligand immobilization to the sensor and allowing a second portion of the ligand containing fluid to be used in a dissociation phase or dissociation step for determining a dissociation rate constant. In another example, these DMF capabilities may be used for dilution of a ligand with a reaction buffer or running buffer to obtain an optimal ligand concentration for ligand immobilization and/or for use in a dissociation phase or step. In still other embodiments, the DMF capabilities may be used for other processes, such as waste removal. DMF cartridge 110 of PR system 100 can be provided, for example, as a disposable and/or reusable cartridge. More details and/or capabilities of DMF cartridges are described herein below.

While the discussion presented herein may involve use of a PR sensor (e.g., a SPR or an LSPR sensor), it is contemplated that other sensors can also be used in place of or in addition to an SPR or LSPR sensor. Such alternative or additional sensor options may include electronic sensors, electrochemical sensors, mechanical sensors, or other appropriate sensor types. For example, sensors may be used, such as biolayer interferometry or piezoelectric sensors. In this regard, the interaction between an analyte and a sensor using the DMF capabilities described herein for sample/sensor interaction may generally be applicable for analysis of an analyte using any appropriate sensor.

PR system 100 may further include a controller 120, a DMF interface 130, an illumination source 140, an optical measurement device 150, and optionally a thermal control mechanism 160. Controller 120 may be electrically coupled to the various hardware components of PR system 100, such as to DMF cartridge 110, illumination source 140, and an optical measurement device 150. In particular, controller 120 may be electrically coupled to DMF cartridge 110 via DMF interface 130, wherein DMF interface 130 may be, for example, a pluggable interface for connecting mechanically and electrically to DMF cartridge 110. Together, DMF cartridge 110, controller 120, DMF interface 130, illumination source 140, and optical measurement device 150 may comprise a PR instrument 105.

Controller 120 may, for example, be a general-purpose computer, special purpose computer, personal computer, microprocessor, or other programmable data processing apparatus. Controller 120 may provide processing capabilities, such as storing, interpreting, and/or executing software instructions, as well as controlling the overall operations of PR system 100 and/or PR instrument 105. The software instructions may comprise machine readable code stored in non-transitory memory that is accessible by the controller 120 for the execution of the instructions. Controller 120 may be configured and programmed to control data and/or power aspects of these devices. For example, with respect to DMF cartridge 110, controller 120 may control fluid operations and/or droplet manipulation by activating/deactivating electrodes. Generally, controller 120 can be used for any functions of the PR system 100. For example, controller 120 can be used to authenticate the DMF cartridge 110 in a fashion similar to how printer manufacturers check for their branded ink cartridges, controller 120 can be used to verify that the DMF cartridge 110 is not expired, controller 120 can be used to confirm the cleanliness of the DMF cartridge 110 by running a certain protocol for that purpose, and so on.

Additionally, in some embodiments, DMF cartridge 110 may include capacitive feedback sensing. For example, a signal may be generated or detected by a capacitive sensor that can detect droplet position, velocity, and size. Further, in other embodiments, instead of capacitive feedback sensing, DMF cartridge 110 may include a camera or other optical device to provide an optical measurement of the droplet position, velocity, and size, which can trigger controller 120 to re-route the droplets at appropriate positions. The feedback can be used to create a closed-loop control system to optimize droplet actuation rate and verify droplet operations are completed successfully.

Optionally, PR instrument 105 can be connected to a network. For example, controller 120 may be in communication with a networked computer 170 via a network 180. Networked computer 170 can be, for example, any centralized server or cloud server. Network 180 can be, for example, a local area network (LAN) or wide area network (WAN) for connecting to the internet.

In PR system 100, illumination source 140 and optical measurement device 150 may be arranged with respect to PR sensing mechanism 112 (e.g., fixed PR sensing and/or in-solution PR sensing) of DMF cartridge 110. The illumination source 140 may be, for example, a light source for the visible range (400-800 nm), such as, but not limited to, a white light-emitting diode (LED), a halogen bulb, an arc lamp, an incandescent lamp, lasers, and the like. Illumination source 140 is not limited to a white light source. Illumination source 140 may be any color light that is useful in PR system 100. Optical measurement device 150 may be used to obtain PR light intensity readings. Optical measurement device 150 may be, for example, a charge coupled device, a photodetector, a spectrometer, a photodiode array, or any combinations thereof. Further, PR system 100 is not limited to one illumination source 140 and one optical measurement device 150 only. PR system 100 may include multiple illumination sources 140 and/or multiple optical measurement devices 150 to support multiple PR sensing elements. Optional thermal control mechanisms 160 may be any mechanisms for controlling the operating temperature of DMF cartridge 110.

Measuring Binding Kinetics

In accordance with the present disclosure, the presently disclosed methods, systems, instruments and DMF cartridge can be used to determine a ligand-target analyte dissociation rate constant or off-rate value ($k_{off}$), the association rate constant or on-rate value ($k_{on}$), and/or the affinity value ($K_D$), wherein the $K_D$ value is a quantitative measurement of affinity between the analyte and ligand, the $k_{on}$ value indicates the kinetic ON-rate of binding, and the $k_{off}$ value indicates the kinetic OFF-rate of binding.

In some embodiments, the PR sensors may include a surface with capture molecules immobilized thereon and wherein the capture molecules can be functionalized by binding one or more ligands. A sample droplet that has the target analyte suspended therein can be brought into fluid communication with the PR sensor and the target analyte can be a binding partner with the ligand molecules of the PR sensor. Then, the optical measurement device can be used to capture the real-time kinetic measurements (e.g., the association phase (i.e., $k_{on}$ value), the dissociation phase (i.e., $k_{off}$ value), and the analyte affinity (i.e., $K_D$ value)) of the binding process.

In some embodiments, dissociation phase comprises regenerating the capture molecules immobilized on the surface of the PR sensor by capturing the target analyte in the dissociation phase thereby leaving the capture molecules immobilized on the PR sensor free/unbound from the target analyte. In some embodiments, the capture molecules may be regenerated by at least 80%, 85%, 90%, 95%, or 99%, such that, for example, when the capture molecules are regenerated by at least 80% no more than 20% of the capture molecules immobilized on the surface of the PR sensor remain bound to the target analyte. In some embodiments regenerating the capture molecules immobilized on the surface may be further regenerated by exposing the PR sensor to a regeneration droplet which may include a low concentration of the capture molecule. Upon further regeneration at least some of the remaining target analyte bound to the capture molecules immobilized on the surface of the PR sensor may be captured. In some embodiments, the exposure time of the regeneration droplet is optimized to improve target analyte capture. In some embodiments, the concentration of the capture molecule in the regeneration droplet may be optimized to improve target analyte capture.

Figure 2:
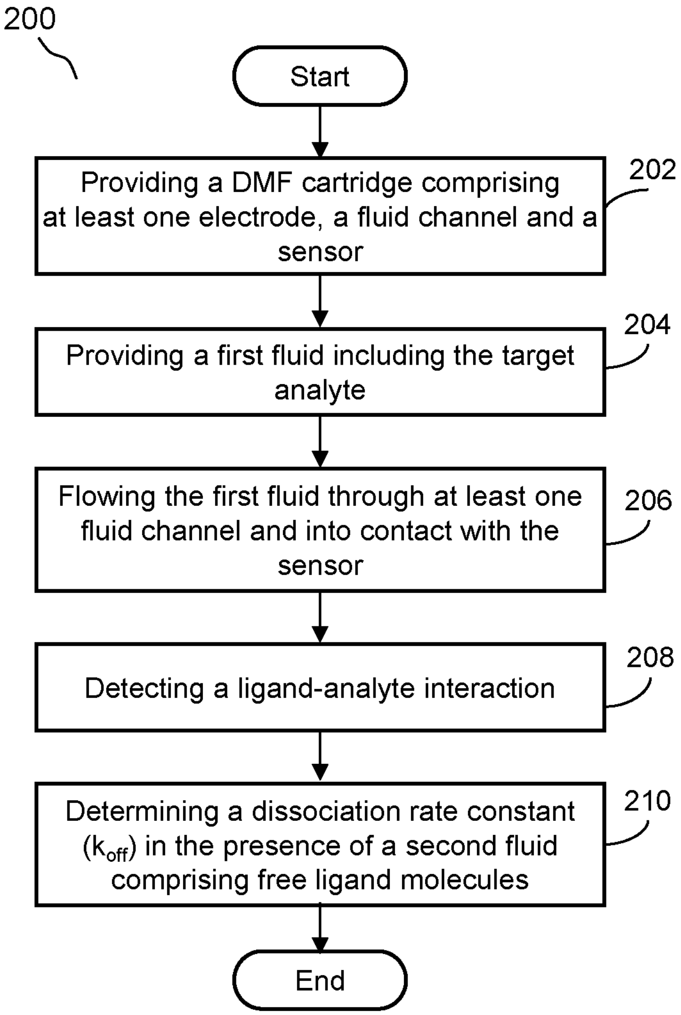
FIG. 2 is a block diagram illustrating a method for determining a dissociation rate constant or off-rate ($k_{off}$) for a target analyte using a digital microfluidics (DMF) cartridge, in accordance with one embodiment of the present disclosure.

FIG. 2 illustrates a flow diagram in accordance with one embodiment of the present disclosure. As shown in FIG. 2, in some aspects the present disclosure is directed to a method for determining a dissociation rate constant or off-rate ($k_{off}$) for a ligand-target analyte.

At step 202, in accordance with this method, a digital microfluidic (DMF) cartridge is provided. In one embodiment, the DMF cartridge comprises (i) at least one electrode to perform fluid operations on a fluid in the DMF cartridge: (ii) a fluid channel; and (iii) a sensor located in the fluid channel, wherein the sensor includes an immobilized ligand. In some embodiments, the cartridge can include a first ligand reservoir storing the immobilization ligand. The first ligand in the first ligand reservoir can be included at any useful amount or concentration for operation of the method and system. For example, in one embodiment, the first ligand can be included at a concentration of between about 1 ng/ml to about 100 μg/mL. In another embodiment, the first ligand can be included at a concentration of between about 100 ng/nL and about 10 μg/mL. In accordance with this embodiment, the first ligand reservoir is in fluid communication with the fluid channel. In other embodiments, the cartridge can include a second ligand reservoir storing the free ligand molecules, wherein the second ligand reservoir is in fluid communication with the fluid channel. The second ligand reservoir, like the first ligand reservoir, can include any useful amount or concentration of the ligand for operation of the method and system. For example, in one embodiment, the second ligand can be included at a concentration of between about 1 ng/ml to about 100 μg/mL. In another embodiment, the second ligand concentration can be about 100 ng/ml to about 10 μg/mL. In some embodiments, the immobilized ligand and the free ligand are the same ligand molecule. In other embodiments, the free ligand can comprise two or more different ligand molecules. In some embodiments, functionalized ligand binding sites on the sensor surface are blocked with a blocking agent prior to determining the dissociation rate constant ($k_{off}$).

At step 204, a first fluid (e.g., a droplet) is provided, such as a reaction fluid or running buffer fluid, wherein the first fluid includes a target analyte to be analyzed. For example, as previously described, a PR sensing means can be used for (1) detecting one or more target analytes and/or chemicals in the sample, and (2) analysis of analytes, such as for measuring binding events in real time to extract ON-rate information, OFF-rate information, affinity information, avidity, aggregation, specificity information, conformation changes, thermodynamic parameters, and/or other data/information related to the molecules under study. In one aspect of the present disclosure, the method and system described herein are used to determine a dissociation rate constant or off-rate ($k_{off}$) of the analyte at the immobilized ligand sensor.

In some embodiments, the cartridge can also include a reaction buffer or running buffer reservoir to store a reaction buffer or running buffer. The target analyte can be added directly to the reaction buffer or running buffer to make up the first fluid. In accordance with this embodiment, the reaction buffer or running buffer reservoir will be in fluid communication with the fluid channel and/or in fluid communication with the first and/or second ligand reservoirs, providing reaction buffer or running buffer for operation of the method or system. In some aspects of the present disclosure, the reaction buffer or running buffer can be used for dilution of the ligand molecules to optimize performance of the method or system, as would be readily understood by one of skill in the art. Use of the reaction buffer or running buffer for ligand dilution allows for all necessary or desired ligand dilutions (i.e. for the first immobilization ligand and/or second dissociation ligand) to be carried out directly on the DMF cartridge. The final ligand concentration can be any useful amount or concentration for operation of the method and system. For example, in some embodiments, the diluted ligand concentration (e.g, the second dissociation ligand in the second fluid) can be at a final concentration of between about 1 ng/mL to about 10 μg/mL. In another embodiment, the diluted ligand concentration can be at a final concentration of between about 10 ng/ml and about 1 μg/mL.

In some embodiments, the cartridge further comprises a means for recovering and storing a ligand containing fluid or droplet. In one embodiment, the ligand containing fluid or droplet can be stored on a storage electrode or in a storage channel, wherein the storage electrode or storage channel is in fluid communication with the fluid channel. In another embodiment, the cartridge can include a recovery electrode, a recovery channel, or a ligand collection reservoir that is in fluid communication with the fluid channel and operable to recover a ligand containing fluid or droplet after an immobilization phase and/or after the dissociation phase. In some aspects, the recovered ligand containing fluid or droplet can be used for another reaction phase in the method or system disclosed herein. For example, a ligand containing fluid or droplet can be used in an immobilization phase to immobilize a ligand to the sensor, and thereafter recovered on a recovery electrode, in a recovery channel, or in the ligand collection reservoir and at a later time be used as the second ligand containing fluid in the dissociation phase to measure or determine the dissociation rate constant or off-rate value ($k_{off}$). In another embodiment, a ligand containing fluid or droplet can be used in the dissociation phase and thereafter recovered on a recovery electrode, in a recovery channel, or in the ligand collection reservoir and at a later time be used in another, subsequent dissociation phase or step. In accordance with these embodiments, a single ligand containing fluid or droplet can be used, and then reused multiple times.

In some embodiments, the first fluid can be split into a first portion and a second portion for customized operation of the method or system herein. For example, a first portion of the fluid can be used for in an immobilization phase to immobilize the ligand to the sensor and a second portion of the ligand containing fluid (i.e., the free ligand molecule containing second fluid) can be used to provide the ligand containing fluid needed for the dissociation phase, in accordance with the present disclosure.

At step 206, the method or system can be operated, as would be readily apparent to one of skill in the art, to move the first fluid (e.g., a droplet) through the fluid channel and bring it into contact with the sensor. In one embodiment, the first fluid and/or the second fluid (e.g., a droplet) flow through the fluid channel in a continuous manner. In another embodiment, the first fluid and the second fluid flow through the fluid channel in separate distinct steps or in separate distinct droplets.

At step 208, the PR sensing mechanism of the system can be operated, in accordance with this method, to detect a ligand-analyte interaction at the sensor. In accordance with this step, sensor data can be captured and analyzed by the PR system and/or the system controller can be used to analyze the sensor data, as described elsewhere herein.

For example, at step 210, the method or system can be operated (e.g., by the controller) to determine a dissociation rate constant or off-rate value ($k_{off}$) during a dissociation phase of the analyte at the sensor. In accordance with this aspect of the disclosure, the dissociation rate constant is determined in the presence of a second fluid containing free ligand molecules. As described elsewhere herein, the presence of ligand molecules in the second fluid used in the dissociation phase prevents the rebinding of the target analyte to the ligand immobilized on the surface, allowing one to overcome the mass transport limited (MTL) kinetics observed in fast dissociating biomolecular systems.

In some embodiments, the sensor data from the PR sensor can be processed, and the $k_{on}$ value, $k_{off}$ value, and $K_D$ value of the analyte of interest may be determined. For example, using the controller of the PR system, the sensor data from the PR sensor can be processed by fitting a binding model to the data and using regression to find the $k_{on}$ value, $k_{off}$ value, and $K_D$ value of the analyte of interest that best represents the experimental data.

Figure 3:
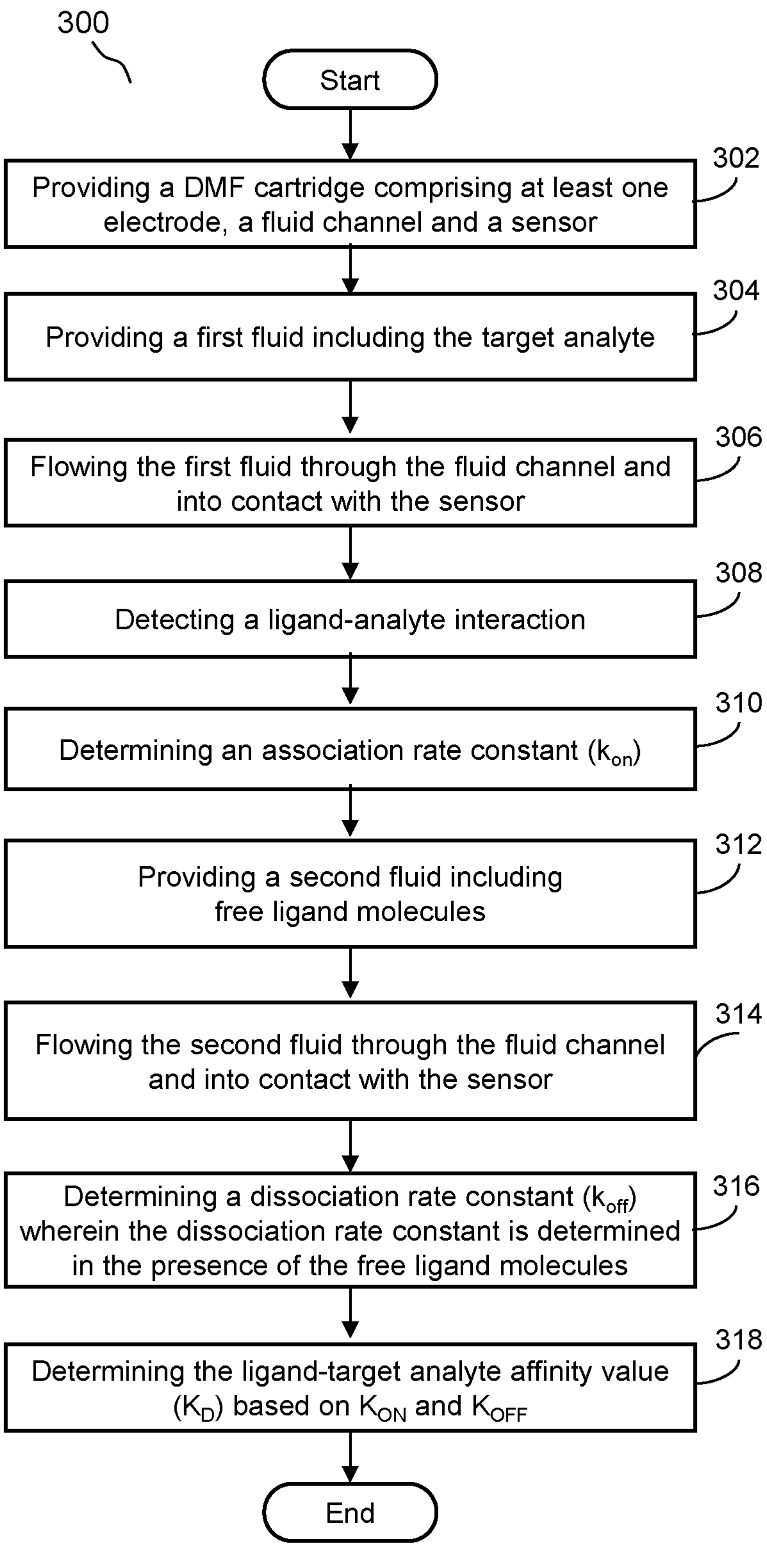
FIG. 3 is a block diagram illustrating a method for determining binding affinity value ($K_D$) between a target analyte and a ligand using a digital microfluidics (DMF) cartridge, in accordance with one embodiment of the present disclosure.

FIG. 3 illustrates a flow diagram in accordance with another embodiment of the present disclosure. As shown in FIG. 3, in some aspects the present disclosure is directed to a method for determining a ligand-target analyte affinity value ($K_D$) between a ligand and a target analyte.

At step 302, in accordance with this method, a digital microfluidic (DMF) cartridge is provided. In one embodiment, the DMF cartridge comprises (i) at least one electrode to perform fluid operations on a fluid in the DMF cartridge: (ii) a fluid channel; and (iii) a sensor located in the fluid channel, wherein the sensor includes an immobilized ligand. In some embodiments, the cartridge can include a first ligand reservoir storing the immobilization ligand. The first ligand in the first ligand reservoir can be included at any useful amount or concentration for operation of the method and system. For example, in one embodiment, the first ligand can be included at a concentration of between about 1 ng/mL to about 100 μg/mL. In another embodiment, the first ligand can be included at a concentration of between about 100 ng/nL and about 10 μg/mL. In accordance with this embodiment, the first ligand reservoir is in fluid communication with the fluid channel. In other embodiments, the cartridge can include a second ligand reservoir storing the free ligand molecules, wherein the second ligand reservoir is in fluid communication with the fluid channel. The second ligand reservoir, like the first ligand reservoir, can include any useful amount or concentration of the ligand for operation of the method and system. For example, in one embodiment, the second ligand can be included at a concentration of between about 1 gn/mL to about 100 μg/mL. In another embodiment, the first ligand can be included at a concentration of between about 100 ng/nL and about 10 μg/mL. In some embodiments, the immobilized ligand and the free ligand are the same ligand molecule. In other embodiments, the free ligand can comprise two or more different ligand molecules. In some embodiments, functionalized ligand binding sites on the are blocked with a blocking agent after immobilization of ligand to the sensor and prior to determining the dissociation rate constant ($k_{off}$).

At step 304, a first fluid (e.g., a droplet) is provided, such as a reaction fluid or running buffer fluid, wherein the first fluid includes a target analyte to be analyzed. For example, as previously described, a PR sensing means can be used for (1) detecting one or more target analytes and/or chemicals in the sample, and (2) analysis of analytes, such as for measuring binding events in real time to extract ON-rate information, OFF-rate information, affinity information, avidity, aggregation, specificity information, conformation changes, thermodynamic parameters, and/or other data/information related to the molecules under study. In one aspect of the present disclosure, the method and system described herein are used to an association rate constant or on-rate ($k_{on}$), a dissociation rate constant or off-rate ($k_{off}$), and determine an affinity value ($K_D$) of an analyte at the immobilized ligand sensor.

In some embodiments, the cartridge can also include a reaction buffer or running buffer reservoir to store a reaction buffer or running buffer. The target analyte can be added directly to the reaction buffer or running buffer to make up the first fluid. In accordance with this embodiment, the reaction buffer or running buffer reservoir will be in fluid communication with the fluid channel and/or in fluid communication with the first and/or second ligand reservoirs, providing reaction buffer or running buffer for operation of the method or system. In some aspects of the present disclosure, the reaction buffer or running buffer can be used for dilution of the ligand molecules to optimize performance of the method or system, as would be readily understood by one of skill in the art. Use of the reaction buffer or running buffer for ligand dilution allows for all necessary or desired ligand dilutions (i.e. for the first immobilization ligand and/or second dissociation ligand) to be carried out directly on the DMF cartridge. The final ligand concentration can be any useful amount or concentration for operation of the method and system. For example, in some embodiments, the diluted ligand concentration (e.g, the second dissociation ligand in the second fluid) can be at a final concentration of between about 1 ng/ml to about 10 μg/mL. In another embodiment, the diluted ligand concentration can be at a final concentration of between about 10 ng/ml and about 1 μg/mL.

In some embodiments, the cartridge further comprises a means for recovering and storing a ligand containing fluid or droplet. In one embodiment, the ligand containing fluid or droplet can be stored on a storage electrode or in a storage channel, wherein the storage electrode or storage channel is in fluid communication with the fluid channel. In another embodiment, the cartridge can include a recovery electrode, a recovery channel, or a ligand collection reservoir that is in fluid communication with the fluid channel and operable to recover a ligand containing fluid or droplet after an immobilization phase and/or after the dissociation phase. In some aspects, the recovered ligand containing fluid or droplet can be used for another reaction phase in the method or system disclosed herein. For example, a ligand containing fluid or droplet can be used in an immobilization phase to immobilize a ligand to the sensor, and thereafter recovered in the ligand collection reservoir and at a later time be used as the second ligand containing fluid in the dissociation phase to measure or determine the dissociation rate constant or off-rate value ($k_{off}$). In another embodiment, a ligand containing fluid or droplet can be used in the dissociation phase and thereafter recovered on a recovery electrode, in a recovery channel, or in the ligand collection reservoir and at a later time be used in another, subsequent dissociation phase or step. In accordance with these embodiments, a single ligand containing fluid or droplet can be used, and then reused multiple times.

In some embodiments, the first fluid can be split into a first portion and a second portion for customized operation of the method or system herein. For example, a first portion of the fluid can be used for in an immobilization phase to immobilize the ligand to the sensor and a second portion of the ligand containing fluid (i.e., the free ligand molecule containing second fluid) can be used to provide the ligand containing fluid needed for the dissociation phase, in accordance with the present disclosure.

At step 306, the method or system can be operated, as would be readily apparent to one of skill in the art, to move the first fluid (e.g., a droplet) through the fluid channel and bring it into contact with the sensor. In one embodiment, the first fluid and/or the second fluid (e.g., a droplet) flow through the fluid channel in a continuous manner. In another embodiment, the first fluid and the second fluid flow through the fluid channel in separate distinct steps or in separate distinct droplets.

At step 308, the PR sensing mechanism of the system can be operated, in accordance with this method, to detect a ligand-analyte interaction at the sensor. In accordance with this step, sensor data can be captured and analyzed by the PR system and/or the system controller can be used to analyze the sensor data, as described elsewhere herein.

For example, at step 310, the method or system can be operated (e.g., by the controller) to determine an association rate constant or on-rate value ($k_{on}$) during an association phase of the analyte at the sensor.

At step 312, the method or system can be operated, as would be readily apparent to one of skill in the art, to move the second fluid (e.g., a droplet) through the fluid channel and bring it into contact with the sensor. In one embodiment, the second fluid flows through the fluid channel in a continuous manner. In another embodiment, the first fluid and the second fluid flow through the fluid channel in separate distinct steps.

At step 314, the PR sensing mechanism of the system can be operated, in accordance with this method, to detect a ligand-analyte interaction at the sensor. In accordance with this step, sensor data can be captured and analyzed by the PR system and/or the system controller can be used to analyze the sensor data, as described elsewhere herein.

For example, at step 316, the method or system can be operated (e.g., by the controller) to determine a dissociation rate constant or off-rate value ($k_{off}$) during a dissociation phase of the analyte at the sensor. In accordance with this aspect of the disclosure, the dissociation rate constant is determined in the presence of a second fluid containing free ligand molecules. As described elsewhere herein, the presence of ligand molecules in the second fluid used in the dissociation phase prevents the rebinding of the target analyte to the ligand immobilized on the surface, allowing one to overcome the mass transport limited (MTL) kinetics observed in fast dissociating biomolecular systems.

Finally, at step 318, the method or system (e.g., through the controller) can be used to determine the ligand-target analyte affinity value ($K_D$) based on the measured association constant ($k_{on}$) and the measured dissociation constant ($k_{off}$). In some embodiments, the sensor data from the PR sensor can be processed, and the $k_{on}$ value, $k_{off}$ value, and $K_D$ value of the analyte of interest may be determined. For example, using the controller of the PR system, the sensor data from the PR sensor can be processed by fitting a binding model to the data and using regression to find the $k_{on}$ value, $k_{off}$ value, and $K_D$ value of the analyte of interest that best represents the experimental data.

What is claimed is:

1. A method for determining a dissociation rate constant in ligand-target analyte affinity analysis, the method comprising:

providing a digital microfluidic (DMF) cartridge comprising:
- at least one electrode to perform fluid operations on a fluid in the DMF cartridge;
- a fluid channel;
- a sensor located in the fluid channel, wherein the sensor includes an immobilized ligand; and
- a first ligand reservoir storing the immobilization ligand, wherein the first ligand reservoir is in fluid communication with the fluid channel;

providing a first fluid including the target analyte;

flowing the first fluid through the fluid channel and into contact with the sensor;

detecting a ligand-analyte interaction; and determining a dissociation rate constant ($k_{off}$) during a dissociation phase of the analyte at the sensor, wherein the dissociation rate constant is determined in the presence of a second fluid containing free ligand molecules.

2. The method of claim 1, wherein the cartridge further includes a second ligand reservoir storing the free ligand molecules, and wherein the second ligand reservoir is in fluid communication with the fluid channel.

3. The method of claim 1, wherein the immobilized ligand and the free ligand are the same ligand molecule.

4. The method of claim 1, wherein the immobilized ligand and the free ligand are different ligands that bind to the same binding site of the target analyte.

5. The method of claim 1, wherein the cartridge further comprises a running buffer reservoir in fluid communication with the fluid channel.

6. The method of claim 1, wherein the first fluid is split into a first portion and a second portion, wherein the first portion is used to immobilize the ligand to the sensor in an immobilization phase and wherein the second portion is used as the free ligand of the second fluid.

7. The method of claim 1, wherein the first fluid and/or the second fluid flow through the fluid channel in a continuous manner.

8. The method of claim 1, wherein the first fluid and the second fluid flow through the fluid channel in separate distinct steps.

9. The method of claim 1, wherein functionalized ligand binding sites on the sensor surface are blocked with a blocking agent after immobilization of ligand to the sensor and prior to determining the dissociation rate constant ($k_{off}$).

10. A method for determining a dissociation rate constant in ligand-target analyte affinity analysis, the method comprising:

providing a digital microfluidic (DMF) cartridge comprising:
- at least one electrode to perform fluid operations on a fluid in the DMF cartridge;
- a fluid channel;
- a sensor located in the fluid channel, wherein the sensor includes an immobilized ligand; and
- a ligand collection reservoir, wherein the ligand collection reservoir is in fluid communication with the fluid channel and operable to recover a ligand containing fluid after an immobilization phase and/or after a dissociation phase;

providing a first fluid including the target analyte;

flowing the first fluid through the fluid channel and into contact with the sensor;

detecting a ligand-analyte interaction; and determining a dissociation rate constant ($k_{off}$) during the dissociation phase of the analyte at the sensor, wherein the dissociation rate constant is determined in the presence of a second fluid containing free ligand molecules.

11. The method of claim 10, wherein the recovered ligand containing fluid is used for another reaction phase.

12. A method for determining a dissociation rate constant in ligand-target analyte affinity analysis, the method comprising:

providing a digital microfluidic (DMF) cartridge comprising:
- at least one electrode to perform fluid operations on a fluid in the DMF cartridge;
- a fluid channel;
- a sensor located in the fluid channel, wherein the sensor includes an immobilized ligand; and
- a running buffer reservoir in fluid communication with the fluid channel, a first ligand reservoir and/or a second ligand reservoir;

providing a first fluid including the target analyte;

flowing the first fluid through the fluid channel and into contact with the sensor;

detecting a ligand-analyte interaction; and determining a dissociation rate constant ($k_{off}$) during a dissociation phase of the analyte at the sensor, wherein the dissociation rate constant is determined in the presence of a second fluid containing free ligand molecules.

13. The method of claim 12, wherein the first fluid comprising the target analyte and/or the second fluid comprising the free ligand molecules further includes the running buffer.

14. The method of claim 12, wherein a first ligand in the first ligand reservoir and/or a second ligand in the second ligand reservoir is at a concentration of between about 1 μg/mL to about 100 μg/mL.

15. The method of claim 14, wherein the concentration of the second ligand in the second ligand reservoir is diluted with the running buffer to a final concentration of from about 0.01 μg/mL to about 10 μg/mL.

* * * * *